US012146742B2

(12) United States Patent
Langfelder et al.

(10) Patent No.: US 12,146,742 B2
(45) Date of Patent: Nov. 19, 2024

(54) INERTIAL NAVIGATION SENSOR WITH REDUCED FOOTPRINT

(71) Applicants: COMMISSARIAT A L'ENERGIE ATOMIQUE ET AUX ENERGIES ALTERNATIVES, Paris (FR); POLITECNICO DI MILANO, Milan (IT)

(72) Inventors: Giacomo Langfelder, Milan (IT); Marco Gadola, Oleggio (IT)

(73) Assignees: COMMISSARIAT A L'ENERGIE ATOMIQUE ET AUX ENERGIES ALTERNATIVES, Paris (FR); POLITECNICO DI MILANO, Milan (IT)

( * ) Notice: Subject to any disclaimer, the term of this patent is extended or adjusted under 35 U.S.C. 154(b) by 195 days.

(21) Appl. No.: 17/806,611

(22) Filed: Jun. 13, 2022

(65) Prior Publication Data

US 2023/0400303 A1  Dec. 14, 2023

(51) Int. Cl.
*G01C 19/06* (2006.01)
*G01C 19/28* (2006.01)
(Continued)

(52) U.S. Cl.
CPC ............. *G01C 19/06* (2013.01); *G01C 19/28* (2013.01); *G01C 19/5705* (2013.01);
(Continued)

(58) Field of Classification Search
CPC .... G01C 19/06; G01C 19/28; G01C 19/5705; G01C 19/5747; G01C 21/18; G01P 15/14
See application file for complete search history.

(56) References Cited

U.S. PATENT DOCUMENTS 10,760,909 B2 *  9/2020  Geisberger ......... G01C 19/5747
10,768,199 B2 *  9/2020  Tocchio ................ G01P 15/097
(Continued)

FOREIGN PATENT DOCUMENTS

EP       4257925 A1 *  10/2023  ......... G01C 19/5712

OTHER PUBLICATIONS

EP-4257925-A1, English (Year: 2023).*
(Continued)

*Primary Examiner* — Ryan D Walsh
(74) *Attorney, Agent, or Firm* — Oblon, McClelland, Maier & Neustadt, L.L.P.

(57) ABSTRACT

The invention relates to an inertial sensor (1) comprising a substrate extending along a drive excitation direction (x) and a detection direction (y) normal to each other, the device plane being perpendicular to a rotation direction (z), a first drive frame (110) and a second drive frame (120), a first sense frame (210), a second sense frame (220), a sense lever (1000) pivotably mounted around a rotation axis (1001), a sensing system comprising a strain gauge (1600) mechanically stressed by the sense lever it is rotating around the rotation axis. The sense lever includes a central portion (1500), a first arm (1100) and a second arm (1200), the central portion having a dimension along the detection direction called central width, the arms having a dimension along the detection direction called arm width, the central width being at least twice greater than the arm width.

17 Claims, 8 Drawing Sheets

(51) Int. Cl.
G01C 19/5705 (2012.01)
G01C 19/5747 (2012.01)
G01C 21/18 (2006.01)
G01P 15/14 (2013.01)

(52) U.S. Cl.
CPC ......... *G01C 19/5747* (2013.01); *G01C 21/18* (2013.01); *G01P 15/14* (2013.01)

(56) References Cited

U.S. PATENT DOCUMENTS

| | | | |
|---|---|---|---|
| 11,460,301 B2* | 10/2022 | Geisberger | G01C 19/5712 |
| 2006/0117852 A1* | 6/2006 | Park | G01P 15/0888 |
| | | | 73/504.16 |
| 2010/0281977 A1* | 11/2010 | Coronato | G01C 19/5747 |
| | | | 29/592.1 |
| 2011/0154898 A1* | 6/2011 | Cazzaniga | G01C 19/5747 |
| | | | 73/504.12 |
| 2014/0260610 A1* | 9/2014 | McNeil | G01C 19/5712 |
| | | | 73/504.12 |
| 2017/0016726 A1* | 1/2017 | Hattass | G01C 19/5733 |
| 2018/0112981 A1* | 4/2018 | Tocchio | G01C 19/5747 |
| 2023/0236013 A1* | 7/2023 | Langfelder | G01C 19/5747 |
| | | | 73/504.12 |

OTHER PUBLICATIONS

Blocher et al., "Purely Inertial Navigation with a Low-Cost MEMS Sensor Array", 2021 IEEE International Symposium on Inertial Sensors and Systems (INERTIAL) IEEE, 2021, 4 Pages.

Chen et al., "Triple Mass Resonator with High Capacity to Tune Frequency and Quality Factor", 2020 IEEE International Symposium on Inertial Sensors and Systems (INERTIAL) IEEE, 2020, 4 Pages.

De Alteriis et al., "Redundant configuration of low-cost inertial sensors for advanced navigation of small unmanned aerial systems", 2019 IEEE 5th International Workshop on Metrology for AeroSpace (MetroAeroSpace). IEEE, 2019, 5 Pages.

Delhaye, "HRG by SAFRAN: The Game-Changing Technology", 2018 IEEE international Symposium on Inertial Sensors and Systems (INERTIAL). IEEE, 2018, 4 Pages.

Hunt et al., "Predictive trajectory estimation during rehabilitative tasks in augmented reality using inertial sensors", 2018 IEEE Biomedical Circuits and Systems Conference (BioCAS) IEEE, 2018, 4 Pages.

Prikhodko et al., "What is MEMS Gyrocompassing? Comparative Analysis of Maytagging and Carouseling", Journal of Microelectromechanical Systems, 2013, vol. 22, No. 6, 10 Pages.

Prikhodko et al., "Towards self-navigating cars using MEMS IMU: Challenges and opportunities", 2018 IEEE International Symposium on Inertial Sensors and Systems (INERTIAL). IEEE, 2018, 4 Pages.

Sharma et al., "A Sub-0.2° /hr Bias Drift Micromechanical Silicon Gyroscope With Automatic CMOS Mode-Matching", IEEE Journal of Solid-State Circuits, vol. 44, No. 5, May 5, 2009, 16 Pages.

Singh et al., "0.0062° /√hr Angle Random Walk and 0.027° /hr Bias Instability from a Micro-Shell Resonator Gyroscope with Surface Electrodes", 2020 IEEE 33rd International Conference on Micro Electro Mechanical Systems (MEMS). IEEE, 2020, 6 Pages.

Weinberg et al., "Error Sources in In-plane Silicon Tuning-Fork MEMS Gyroscopes", Journal of Microelectromechanical Systems, vol. 15, No. 3, 2006, 13 Pages.

* cited by examiner

INERTIAL NAVIGATION SENSOR WITH REDUCED FOOTPRINT

TECHNICAL FIELD

The present invention relates to inertial sensors, particularly to angular displacement sensors that can be used to detect angular position, speed or acceleration, and more particularly to single axis pitch/roll miniaturized high performance gyroscopes.

PRIOR ART

Rotational movement detection is important in the automotive and aviation sectors as well as satellite navigation systems. However, to enable inertial navigation, inertial sensors need to match very tight specifications, in particular in terms of noise (expressed through angle random walk (ARW)), of stability (expressed through bias instability (BI)) and of robustness to shock and vibrations. For example, ARW has to be lower than $0.005°/\sqrt{hr}$ and BI lower than $0.05°/hr$.

Gyroscopes that match inertial navigation requirements can nowadays be classified in the following three main categories:

Non-miniaturized systems like fiber optic gyroscopes (FOG), ring laser gyroscopes (RLG) or hemispherical resonator gyroscopes (HRG). All these technologies, which have a long history behind it, are formed by bulky elements, weighing about 1 kg or more and with an overall volume of several tens of cubic cm. Their cost is in the order of several ten thousand dollars. As for HRG, see for example F. Delhaye, "HRG by SAFRAN: The game-changing technology," in Proc. IEEE Int. Symp. Inertial Sensors Syst. (INERTIAL), Lake Como, Italy, March 2018, pp. 1-4.

Semi-Miniaturized systems like glass-blown HRG gyroscopes and nuclear magnetic resonance gyroscopes (NMR). This relatively new technologies exploit nonstandard processes, which are not based on planar microelectromechanical systems (MEMS) technology, require manual alignment of different elements and result in devices of a volume of several cubic cm. See e.g.: S. Singh et al., "$0.0062°/\sqrt{hr}$ angle random walk and $0.027°/hr$ bias instability from a micro-shell resonator gyroscope with surface electrodes," in Proc. IEEE 33rd Int. Conf. Micro Electro Mech. Syst. (MEMS), Vancouver, Canada, January 2020.

Miniaturized systems like mode-split MEMS gyroscopes, mode-match MEMS gyroscopes, rate-integrating MEMS gyroscopes. Gyroscopes based on MEMS systems can be miniaturized so as to be integrated in smartphones and smart devices, or to improve the so-called C-SWaP parameters (cost, size, weight and power ratio), very critical for several high-end applications. Such gyroscopes monitor the motion of proof masses or sense frames fixed to drive frames and to which a periodical vibration has been applied along an excitation direction also called drive excitation direction. This periodical vibration is referred as the drive frame motion. When the device is subjected to a rotational motion whose central axis is extending along a direction perpendicular to the drive frame motion direction, the proof masses are subjected to a Coriolis acceleration inducing movement along a direction perpendicular to both the direction along the rotation vector and the drive excitation direction. This movement is a function of the rotational motion. Hence, by monitoring this movement, it is possible to determine the rotational movement. However, these technologies are based on capacitive transduction and require large voltage (e.g. 40 V) and relatively large volume (e.g. several $mm^3$) to match the desired performance.

Therefore, a general objective of the present invention is to provide an inertial sensor with performances at least equivalent to already existing technologies but within a smaller sensor footprint and structural volume. Preferably, this inertial sensor would meet navigation grade specifications.

SUMMARY

To achieve this objective, it is provided an inertial sensor comprising:

a substrate which defines a device plane extending along a drive excitation direction and a detection direction normal to the drive excitation direction, the device plane being perpendicular to a rotation direction, a first drive frame and a second drive frame, a first sense frame connected to the first drive frame through at least one first decoupling spring that enables mechanical drive between the first drive frame and the first sense frame in the drive excitation direction and mechanically decouples the first drive frame and the first sense frame in the detection direction a second sense frame connected to the second drive frame through at least one second decoupling spring that enables mechanical drive between the second drive frame and the second sense frame in the drive excitation direction and mechanically decouples the second drive frame and the first sense frame in the detection direction, a sense lever pivotably mounted around a rotation axis directed along the rotation direction, a sensing system connected to the sense lever and comprising at least one strain gauge mechanically stressed by the sense lever when said sense lever is rotating around the rotation axis, an excitation device configured to force the first drive frame and the second drive frame into opposite motions going along the drive excitation direction.

In this inertial sensor, the sense lever includes a central portion, a first arm and a second arm. The first arm is joined to a first side of the central portion and the second arm is joined to a second side, opposite the first side, of the central portion. The first sense frame is connected to the first arm of the sense lever through at least one first sense spring that enables mechanical drive between the first sense frame and the sense lever in the detection direction and mechanically decouples the first sense frame and the sense lever in the drive excitation direction. The second sense frame is connected to the second arm of the sense lever through at least one second sense spring that enables mechanical drive between the second sense frame and the sense lever in the detection direction and mechanically decouples the second sense frame and the sense lever in the drive excitation direction. Finally, in this inertial sensor, the central portion of the sense lever has a dimension along the detection direction called central width, while the first arm and the second arm of the sense lever have a same dimension along the detection direction called arm width. The sense lever has the particularity of having a central width at least twice greater than the arm width.

This particular architecture of the sense lever improves its rigidity and minimizes its deformation. As a result, the stress coming from the Coriolis effect is optimally transmitted onto the sensing system. Together with the use of nanometric strain gauges, this makes it possible for the inertial sensor to reach performance similar to previous inertial navigation devices, but within a much smaller footprint.

BRIEF DESCRIPTION OF THE FIGURES

The aims, objects, as well as the features and advantages of the invention will appear better from the detailed description of an embodiment of the latter which is illustrated by the following appended drawings wherein.

Figure 1:
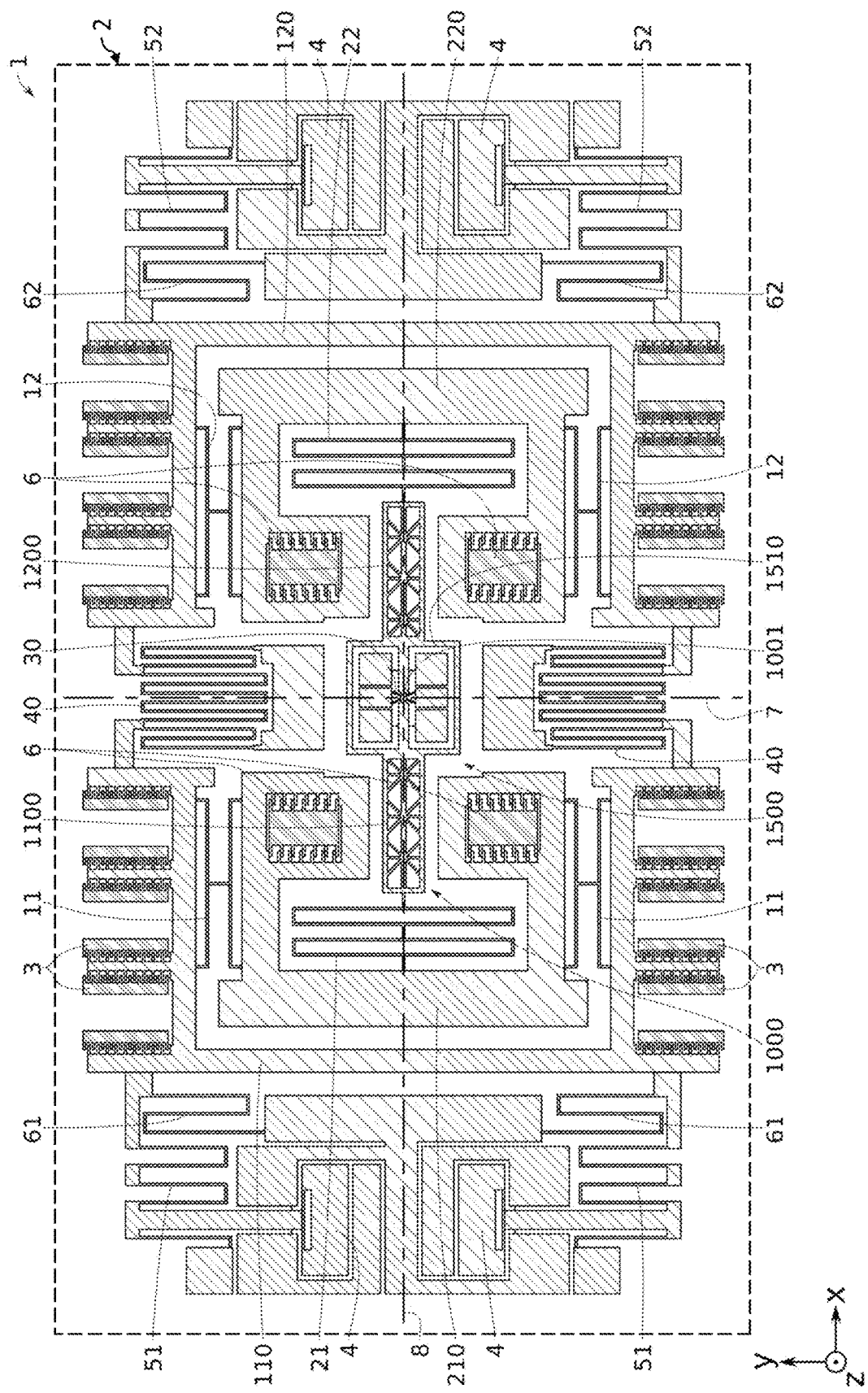
FIG. 1 depicts the inertial sensor as claimed in the present patent application architecture, captured as a top view in the device plane.

The drawings are provided as examples and do not limit the invention. They form schematic principle representations intended to facilitate the understanding of the invention and are not necessarily to the scale of the practical applications. In particular, the thicknesses and widths of the different illustrated elements are not necessarily representative of reality or of realistic shape factors.

DETAILED DESCRIPTION

Before starting a detailed review of embodiments of the invention, optional features that could possibly be used in combination or alternatively are set out hereinafter.

In a preferred example, the central width is at least three times greater than the arm width.

According to an exemplary aspect of the present invention, the central portion comprises a central frame defining an outer closed contour of said central portion.

According to an exemplary aspect of the present invention, the central portion comprises a central beam extending along the drive excitation direction, the central beam including a first end and a second end, the first end being joined to a first inner side of the central frame and the second end being joined to a second inner side, opposite the first inner side, of the central frame.

In a preferred example, the central portion has a rectangular contour in the device plane.

According to an exemplary embodiment of the present invention, at least one of the first arm and the second arm has a triangulated structure.

According to an exemplary embodiment of the present invention, the sensing system comprises a first strain gauge mechanically stressed by the first arm of the sense lever and a second strain gauge mechanically stressed by the second arm of the sense lever when said sense lever is rotating around the rotation axis.

In a preferred example the sensing system further comprises a first additional strain gauge mechanically stressed by the first arm of the sense lever and a second additional strain gauge mechanically stressed by the second arm of the sense lever when said sense lever is rotating around the rotation axis, the first additional strain gauge being symmetrical to the second strain gauge around the rotation axis and the second additional strain gauge being symmetrical to the first strain gauge about the rotation axis.

According to an exemplary embodiment of the present invention, the first sensing frame accommodates a first compensation electrode and the second sensing frame accommodates a second compensation electrode.

In a preferred example, the first sensing frame further accommodates a first additional compensation electrode and the second sensing frame further accommodates a second additional compensation electrode, the first compensation electrode and the second compensation electrode on the one hand and the first additional compensation electrode and the second additional compensation electrode on the other hand being symmetrical about the rotational axis.

According to an exemplary embodiment of the present invention, the sense lever is connected to the substrate through a single central hinge.

According to an exemplary embodiment of the present invention, the first drive frame and the second drive frame are connected through at least one connection spring.

According to an exemplary embodiment of the present invention, the first drive frame and the second drive frame are both connected to the substrate through at least one additional drive spring.

According to an exemplary embodiment of the present invention, the central region of the sense lever accommodates the sensing system.

In a preferred example the sensing system comprises at least one connection zone configured to electronically connect the at least one strain gauge.

A detection system comprising a plurality of inertial sensors according to the present invention.

The detection system according to the present invention, wherein at least two inertial sensors have perpendicular rotation directions.

The following detailed description of the invention refers to the accompanying drawings. While the description includes exemplary embodiments, other embodiments are possible, and changes may be made to the embodiments described without departing from the spirit and scope of the invention.

Some advantageous features will be described below. Then some exemplary embodiments and use cases will be further detailed in regard with the drawings.

Structural Description

The inertial sensor 1 comprises a substrate 2 extending along a drive excitation direction x and a detection direction y. The drive excitation direction x and the detection direction y are normal to each other. They are both also normal to a third direction called rotation direction z. The substrate 2 defines a plane called device plane also extending along the drive excitation direction x and the detection direction y.

The inertial sensor 1 includes an excitation device 3 required for setting into motion the device thereby creating a Coriolis effect. The excitation device 3 typically includes push-pull comb finger electrodes 8 in an anti-phase motion. Comb finger electrodes actuators are common knowledge in microelectronics. It makes use of tangential electrostatic forces for driving. Such actuators are consisting of pairs of comb-fingers stators facing each other and driving comb-fingers rotors attached to the device to be actuated.

Figure 3A:
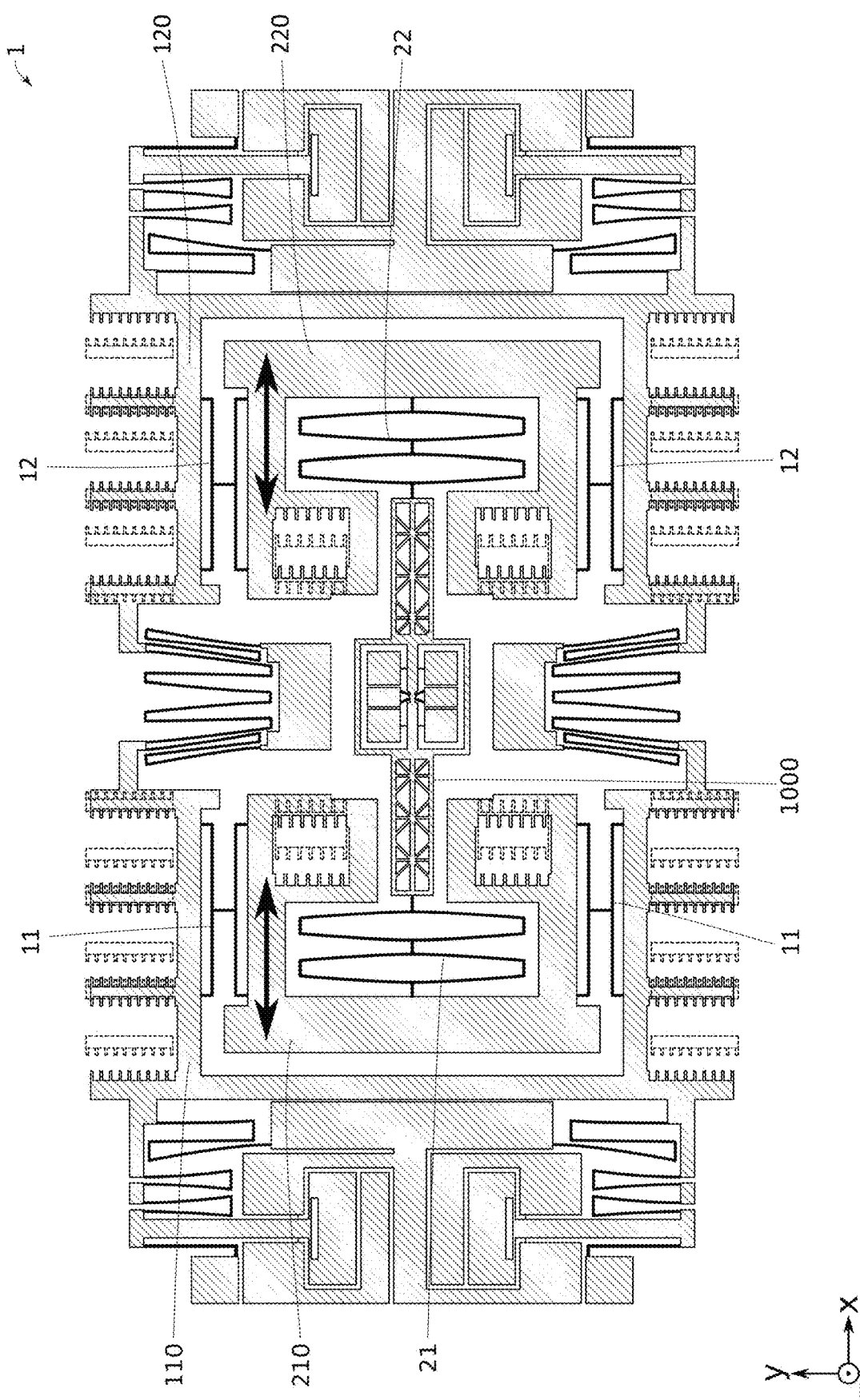
FIG. 3A illustrates the inertial sensor as claimed in the present patent application in its drive mode.

In this case, the excitation device is configured to put into motion along the drive excitation direction x a first drive frame 110 and a second drive frame 120, as depicted in FIG. 3A. The first drive frame 110 and the second drive frame 120 are actuated in an anti-phase motion, meaning the direction of their respective motions are opposite to each other. This consists in the so-called drive motion. In FIG. 3A, comb-finger stators are shown in dashed lines as their distance to comb-finger rotors is purposely exaggerated to illustrate the drive motion.

Preferably, the first drive frame 110 and the second drive frame 120 are symmetrical to each other with respect to a plane extending along the detection direction y and the rotation direction z called first transversal plane 7. Advantageously, the first drive frame 110 and the second drive frame 120 are connected to each other through connection springs 40. The presence of such connections springs 40 ensures a single coupled anti-phase drive mode. The connection springs 40 are preferably tuning fork springs.

Advantageously, the first drive frame 110 and the second drive frame 120 are both connected to the substrate 2 through at least one additional drive spring 70.

The inertial sensor 1 also features a first sense frame 210 and a second sense frame 220. The first sense frame is connected to the first drive frame through first decoupling springs 11. The structure of the first decoupling springs 11 is such that when the first drive frame 110 is put into motion by the excitation device along the drive excitation direction, the first drive frame drives the first sense frame in the same direction through the first decoupling springs 11. On the contrary, the first decoupling springs 11 is configured to mechanically decouple the first drive frame and the first sense frame in the detection direction. In other words, a motion of the first sense frame 210 in the detection direction y does not induce a motion of the first drive frame 110. This requires that the first decoupling springs have a high stiffness in the drive excitation direction x and a low stiffness in the detection direction y. To achieve so, it is advantageous that the first decoupling springs 11 have a much greater, typically 20 to 100 times greater, dimension in the drive excitation direction x than in the detection direction y. In this regard, one can say the first decoupling springs are principally extending in the drive excitation direction x.

The second sense frame is connected to the second drive frame 120 through second decoupling springs 12. The features of the first decoupling springs 11 can be applied mutatis mutandis to the second decoupling springs 12.

The inertial sensor 1 further comprises a sense lever 1000 pivotably mounted around a rotation axis 1001 directed along the rotation direction z. The sense lever 1000 is connected to the first sense frame 210 and to the second sense frame 220 through at least one first sense spring 21 and at least one second sense spring 22, respectively. The first sense spring 21 is configured so that when the first sense frame 210 is moving along the drive excitation direction x, it does not induce a motion of the sense lever 1000. By contrast, in order to achieve the detection, when the first sense frame 210 is moving along the detection direction y, it drives the sense lever 1000 in this same direction through the first sense spring 21. Hence, the first sense spring 21 has a high stiffness in the detection direction y and a low stiffness in the drive excitation direction x. To achieve so, it is advantageous that the first sense spring 21 has a much greater, typically 20 to 100 times greater, dimension in the detection direction y than in the drive excitation direction x.

In this regard, one can say the first sense spring is principally extending in the detection direction y.

Figure 3B:
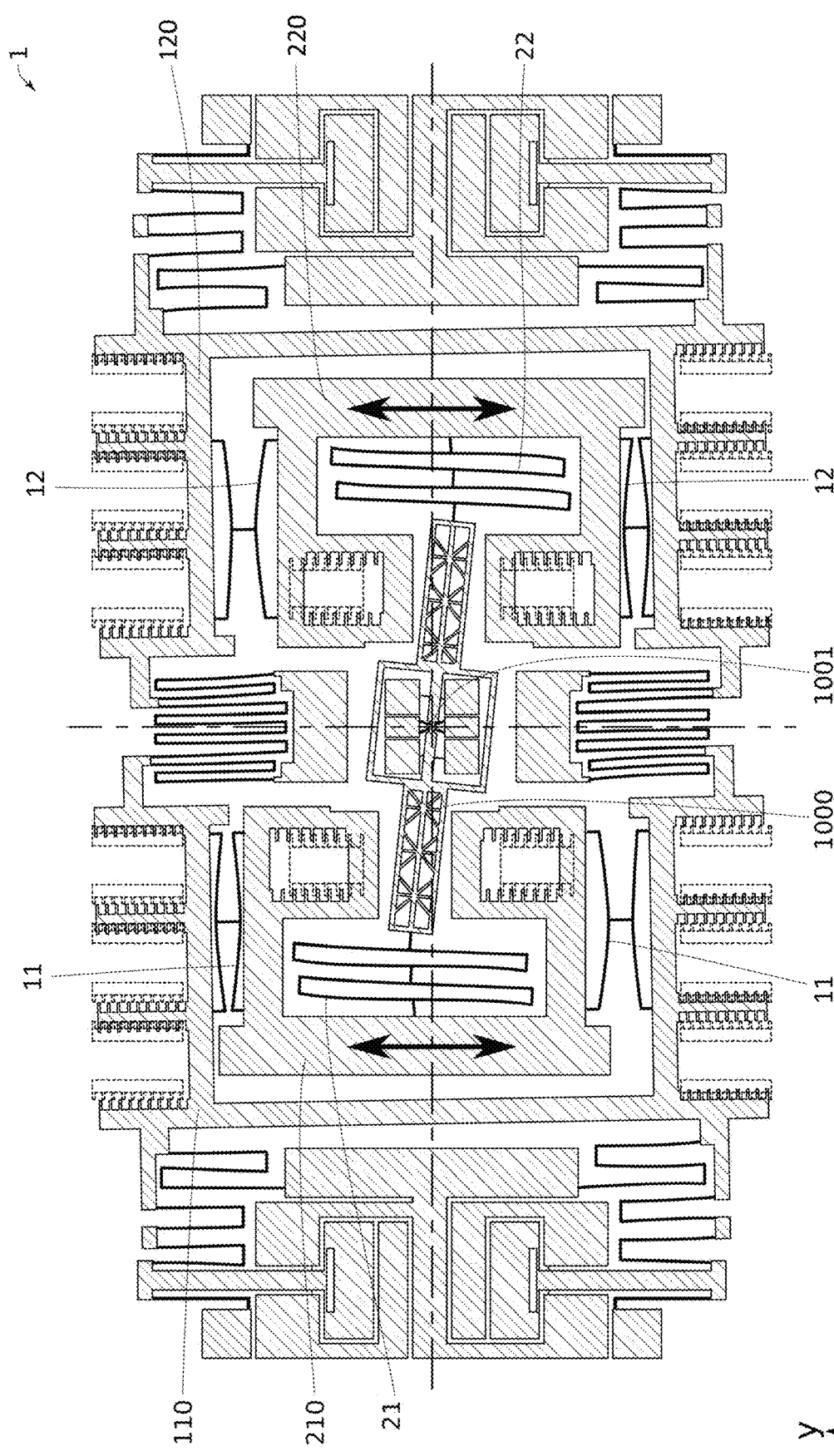
FIG. 3B illustrates the inertial sensor as claimed in the present patent application in its sense mode.

Upon being excited along the drive excitation direction x and under the effect of the Coriolis acceleration, the first and second sense frames 210, 220 are driven along the detection direction y in an anti-phase motion. More specifically, as depicted in FIG. 3B, when the first sense frame 210 goes one way along the detection direction y, the second sense frame 220 is moving in the opposite direction: their motions are symmetrical about the rotation axis 1001. This motion is transmitted to the sense lever 1000 which, upon being driven in opposite directions at each of its extremities by the sense springs 21, 22, rotates around the rotation axis 1001. This motion, called sense motion, is therefore representative of the rotation movement the inertial sensor 1 is subjected to.

Sensing System

The inertial sensor further includes a sensing system connected to the sense lever 1000.

The sensing system is actuated by the sense lever 1000 when it rotates around the rotation axis 1001, allowing Coriolis force sensing.

The sensing system comprises at least one strain gauge that gets mechanically stressed—either by traction or compression—when the sense lever 1000 rotates in the device plane as depicted in FIG. 3B. Preferably, the sensing system includes a pair of strain gauges 1600 comprising a first strain gauge mechanically stressed by the first arm 1100 of the sense lever and a second strain gauge mechanically stressed by the second arm 1200 of the sense lever. Advantageously, the sensing system further includes an additional pair of strain gauges 1700 comprising an additional first strain gauge mechanically stressed by the first arm 1100 of the sense lever and an additional second strain gauge mechanically stressed by the second arm 1200 of the sense lever. Advantageously, the strain gauges are piezoresistive gauges.

Using multiple strain gauges in parallel makes it possible to increase even more transduction and improve the minimum achievable ARW and BI. However, this comes at the cost of a larger biasing current: a compromise has to be made.

Lever Design

The sense lever 1000 features three main portions: a central portion 1500, a first arm 1100 and a second arm 1200. All three are configured in one piece. More specifically, they can be formed during the same fabrication steps and be made of the same material like monocrystalline silicon or polysilicon. The first arm 1100 and the second arm 1200 are situated on either side of the central portion 1500. More specifically, the central portion 1500 features a first side 1501 and a second side 1502, opposite each other, at which the first arm 1100 and the second arm 1200 are respectively connected. The first arm 1100 and the second arm 1200 are centered along the first side 1501 and the second side 1502 of the central portion 1500 respectively.

The first sense spring 21 is connected to the sense lever 1000 at an end of the first arm 1100 opposite the central portion 1500. In a similar manner, the second sense spring 22 is connected to the sense lever 1000 at an end of the second arm 1200 opposite the central portion 1500.

The central portion 1500 comprises a central beam 1520 extending mainly along the drive excitation direction x between the first side 1501 and the second side 1502 of the central portion 1500. The sense lever 1000 is pivotably mounted around the rotation axis z through a central hinge 30 connected to the substrate through anchor points 5. The central hinge 30 is connected to the central portion 1500 at a central point of the central beam 1520 equidistant between the first side 1501 and the second side 1502 of the central portion 1500. The central hinge 30 features hinge beams 31 that preferably form 45-degree angles in the device plane with both the anchor points 5 and the central beam 1520. This way, process nonuniformities in the crystalline silicon orientation have a low impact on the central hinge 30 stiffness.

The central portion 1500 has a dimension called central length $L_{central}$ in the drive excitation direction x and a dimension called central width $l_{central}$ in the detection direction y. The first arm 1100 and the second arm 1200 have the same dimension called arm length $L_{arm}$ in the drive excitation direction x and the same dimension called arm width $l_{arm}$ in the detection direction y. A special feature of the inertial sensor 1 is that the central width $l_{central}$ is greater, and preferably at least twice greater, than the arm width $l_{arm}$. The central region 1500 preferably comprises a central frame 1510. This central frame 1510 defines a closed outer contour of the central portion 1500. The central frame 1510 typically features four sides—preferably each made of a beam section—opposite in pairs. Adjacent sides of the central frame 1510 are typically perpendicular. The central frame 1510 is advantageously rectangular or even square-shaped in the device plane, therefore so is the central portion 1500. The central frame 1510 has a dimension $L_{frame,x}$ in the drive excitation direction x that is typically at least 5 times, preferably at least 10 times, smaller than $L_{central}$ and a dimension $L_{frame,y}$ in the detection direction y that is typically at least 5 times, preferably at least 10 times, smaller than $l_{central}$. $L_{frame,x}$ and $L_{frame,y}$ are typically equal to the same value $L_{frame}$ called frame width.

The central width $l_{central}$ being at least twice greater than the arm width $l_{arm}$, as well as the central portion 1500 having a rectangular shape, are both features of the sense lever 1000 that help minimize its deformation, thus guaranteeing an optimized stress transmission onto the strain gauges. Indeed, the ability of an element to resist bending forces is commonly evaluated through the calculation of its second moment of area. The second moment of area formula of the central portion 1500 has to be adjusted according to its exact architecture. It is clear, however, that independently of the precise design of the central portion 1500, the greater $l_{central}$ is, the better it will resist under bending stresses applied in the drive excitation direction x. This has a direct effect on the stress resistance of the sense lever 1000 as a whole. The central portion 1500 therefore constitute a robust element of the sense lever 1000 that does not feature in previous sensors.

According to an advantageous embodiment, the first arm 1100 and the second arm 1200 are triangulated structures in a plane parallel to the device plane. Such a structure enhances the rigidity of the arms 1100, 1200. It prevents unwanted deformation of the lever 1000 that could lead to quality degradation of the measurement and/or fail of the inertial sensor 1 overtime.

Figure 2A:
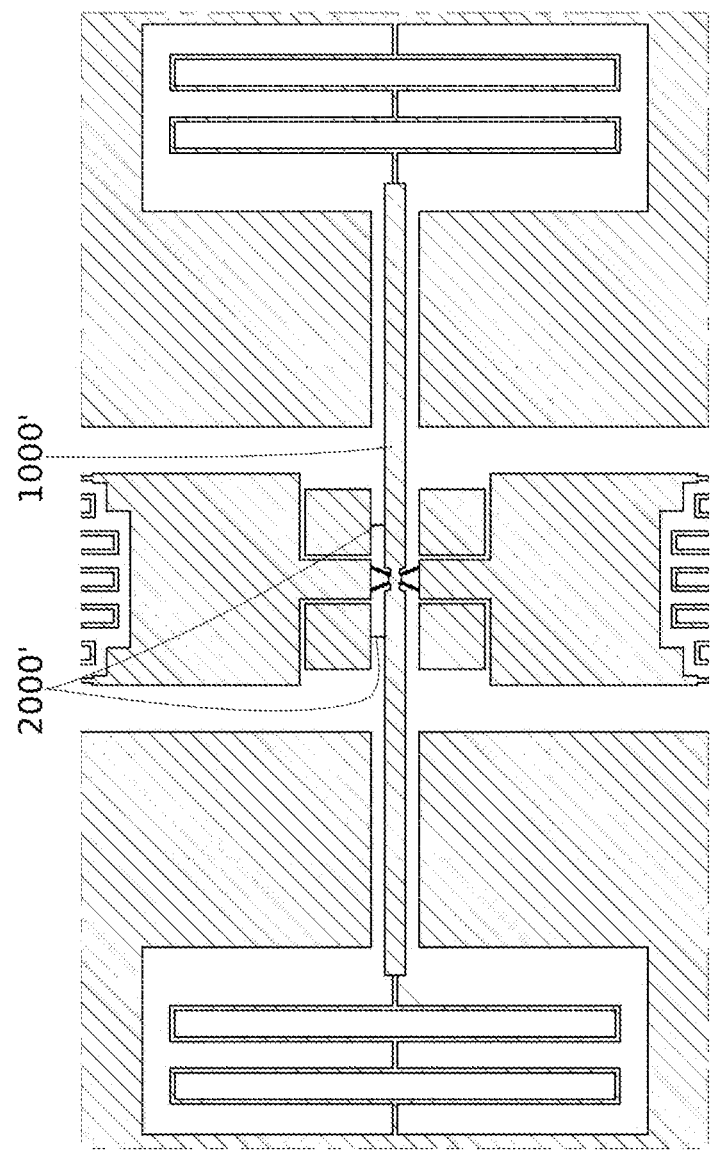
FIG. 2A depicts a gyroscope sense lever from already existing technologies.
Figure 2B:
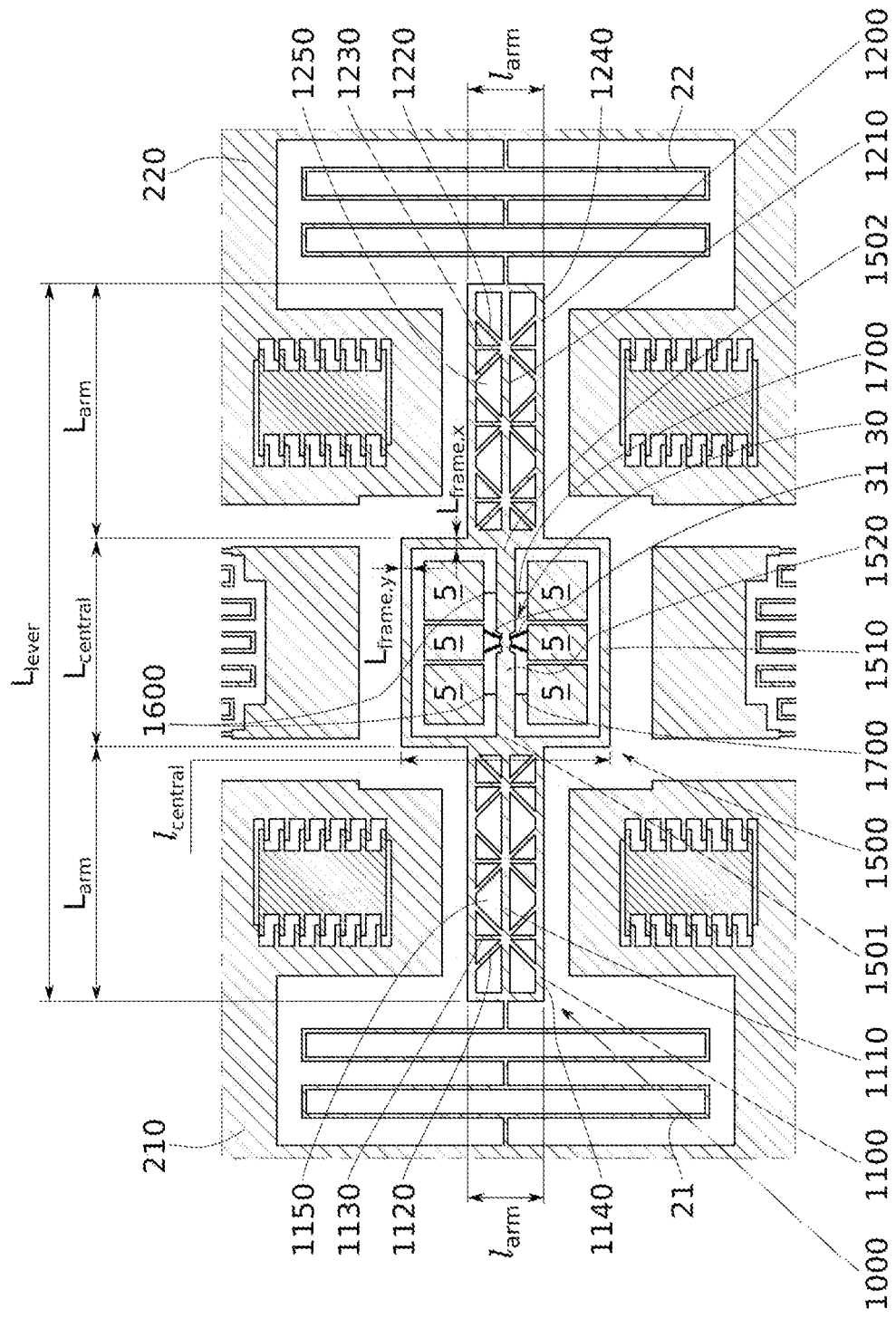
FIG. 2B depicts a sense lever as claimed in the present patent application.

Different kinds of trusses can be implemented (Pratt truss, Warren truss, Howe truss . . . ). An advantageous embodiment of the truss is depicted in both FIGS. 1 and 2B. In this example, each arm 1100, 1200 comprises an external frame 1140, 1240 having a rectangular shape. Each arm also features a central arm beam 1110, 1210 extending essentially in the drive excitation direction x, from the central portion 1500 to the sense spring 21, 22 the arm 1100, 1200 is connected to. The central arm beam 1110, 1210 is connected to the external frame 1140, 1240 through a plurality of truss beams. Some of the truss beams, called vertical truss beams 1130, 1230, are mainly extending along the detection direction y. Therefore, they are normal to the central arm beam 1110, 1210 and the side of the external frame 1140, 1240 they are connected to. The vertical truss beams 1130, 1230 help the arms 1100, 1200 maintain a high rigidity in the detection direction y. Other truss beams, called diagonal truss beams 1120, 1220, form lower angles with the central arm beam 1110, 1210 and the side of the external frame 1140, 1240 they are connected to. Preferably, the angle between the diagonal truss beams 1120, 1220 and the central arm beam 1110, 1210 on the one hand and between the diagonal truss beams 1120, 1220 and the external frame 1140, 1240 is lower than 60°, advantageously equal to 45°. The diagonal truss beams 1120, 1220 preferably define bisectors of the angles defined by the central arm beams 1110, 1210 and the vertical truss beams 1130, 1230. The diagonal truss beams 1120, 1220 participate in preventing the deformation of the arms 1100, 1200 both in the drive excitation direction x and in the detection direction y. The central arm beam 1110, 1210 is typically parallel to the sides of the external frames 1140, 1240 the truss beams 1130, 1230, 1120, 1220 are connected to. Preferably, the external frame 1140, 1240, the central arm beam 1110, 1210, the vertical truss beams 1130, 1230 and the diagonal truss beams 1120, 1220 are all in one piece. They can be formed during the same fabrication steps and be made of the same material.

Independent of the architecture of the truss, the truss beams define apertures 1150, 1250 in the arms 1100, 1200. As a result, the mass of the arms 1100, 1200 is smaller than the mass of commonly used, full lever arms 1000' (connected to strain gauges 2000') like depicted in FIG. 2A. This mass saving benefits to the detection as it makes the sense lever 1000 even more sensible to the motion of the sense frames 210, 220 in the detection direction y and therefore improves transduction of Coriolis force onto the strain gauges 1600, 1700. The mass saving also makes it possible to better reject the vibrations and/or accelerations along all the spatial directions, which also benefits to detection.

Typically, the first arm 1100, the second arm 1200, the first apertures 1150 and the second apertures 1250 respectively have a first arm surface, a second arm surface, a first aperture surface and a second aperture surface in the device plane. Preferably, the first aperture surface and the second aperture surface representing at least 90% of the first arm surface and the second arm surface, respectively.

Advantageously, the sense lever 1000 is symmetrical with respect to the first transversal plane 7 and a second transversal 8 plane defined by the drive excitation direction x and the rotation direction z.

Overall, this new sense lever 1000 design better transduces motion onto the strain gauges, resulting in a higher scale factor and lower noise. It also better rejects accelerations, which means better immunity to harsh environment.

Drive Sensing

Figure 4:
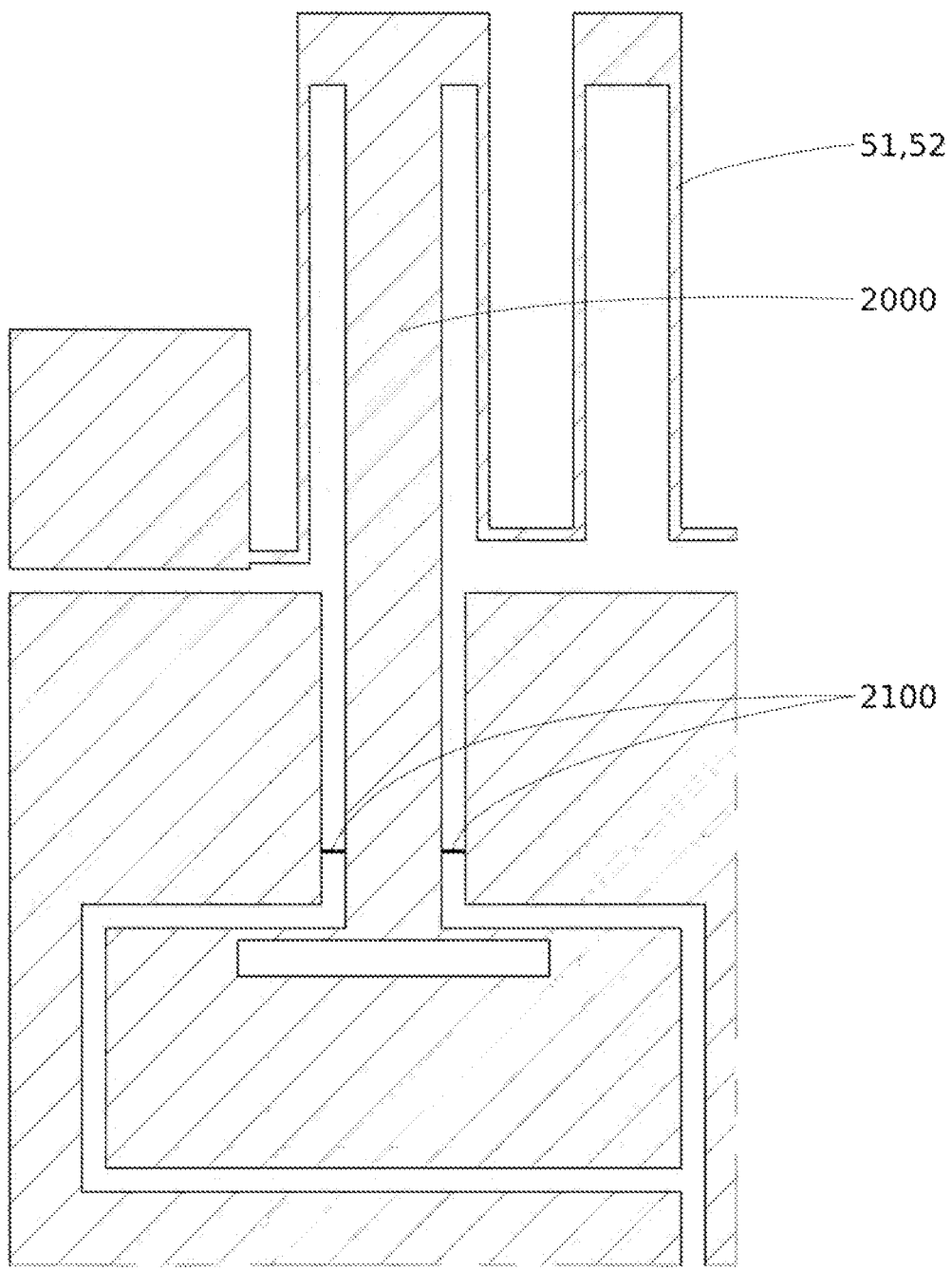
FIG. 4 depicts the drive sensing system of the inertial sensor as claimed in the present patent application.

In a preferred embodiment, the inertial sensor 1 further includes drive springs 51, 52 that connect the first and the second drive frames 110, 120 to drive sense levers 2000. Advantageously, the drive springs 51, 52 are 3-fold springs. Each of the drive sense levers 2000 is connected at one end to a drive spring 51, 52 and at the other end to an anchor point 4 of the substrate 2. The drive springs 51, 52 are mainly extending along the detection direction y. They allow but attenuate mechanical drive in the drive excitation direction x between the drive frames 110, 120 and the drive sense levers 2000. As a result, when the drive frames 110, 120 are moving along the drive excitation direction x, the drive sense levers 2000 get deformed and deliver stress into drive sense gauges 2100. This system, depicted in FIG. 4, allows drive motion and drive frequency detection. Both can be implemented in the electronic scheme further described below so as to improve measurement quality. For example, drive frequency detection is especially useful for compensation of temperature effects to further improve output stability under temperature sweeps. With the addition of the drive springs 51, 52, the drive sense levers 2000 system takes here a minimum role in setting the drive-mode stiffness. It can therefore be independently optimized for signal maximization and corresponding minimization of drive loop phase noise.

Compensation Electrodes

In an advantageous embodiment, the first and the second sense frames 210, 220 both accommodate quadrature nulling electrodes 6. These electrodes 6 help reduce the zero-rate-output (ZRO) instability. Indeed, among the various sources of zero-rate-output (ZRO) instability, leakage of quadrature $\Omega_q$ into the sense channel after demodulation errors $\phi_{er}$ is a huge contribution due to possible drifts of both these terms. Referred quadrature $\Omega_q$ originates from electromechanical imperfections, in particular related to non-orthogonality between drive motion and the sense axis—here between the drive excitation direction x and the detection direction y. Suitable compensating electrodes 6 in closed-loop circuits can compensate quadrature caused by such imperfections.

Moreover, the implemented quadrature compensation is based on strain sensing, typically NEMS (nanoelectromechanical systems) resistive sensing, as opposed to capacitance detection. Capacitance couplings are therefore minimized, yielding an optimal compensation because of the reduced error in phase $\phi_{er}$ resulting from this minimized capacitance couplings.

The presence of quadrature compensation electrodes 6, together with appropriate electronic control of said compensation, makes it possible to reach BI<0.05°/hr.

Rejection of Spurious Modes

Figure 3C:
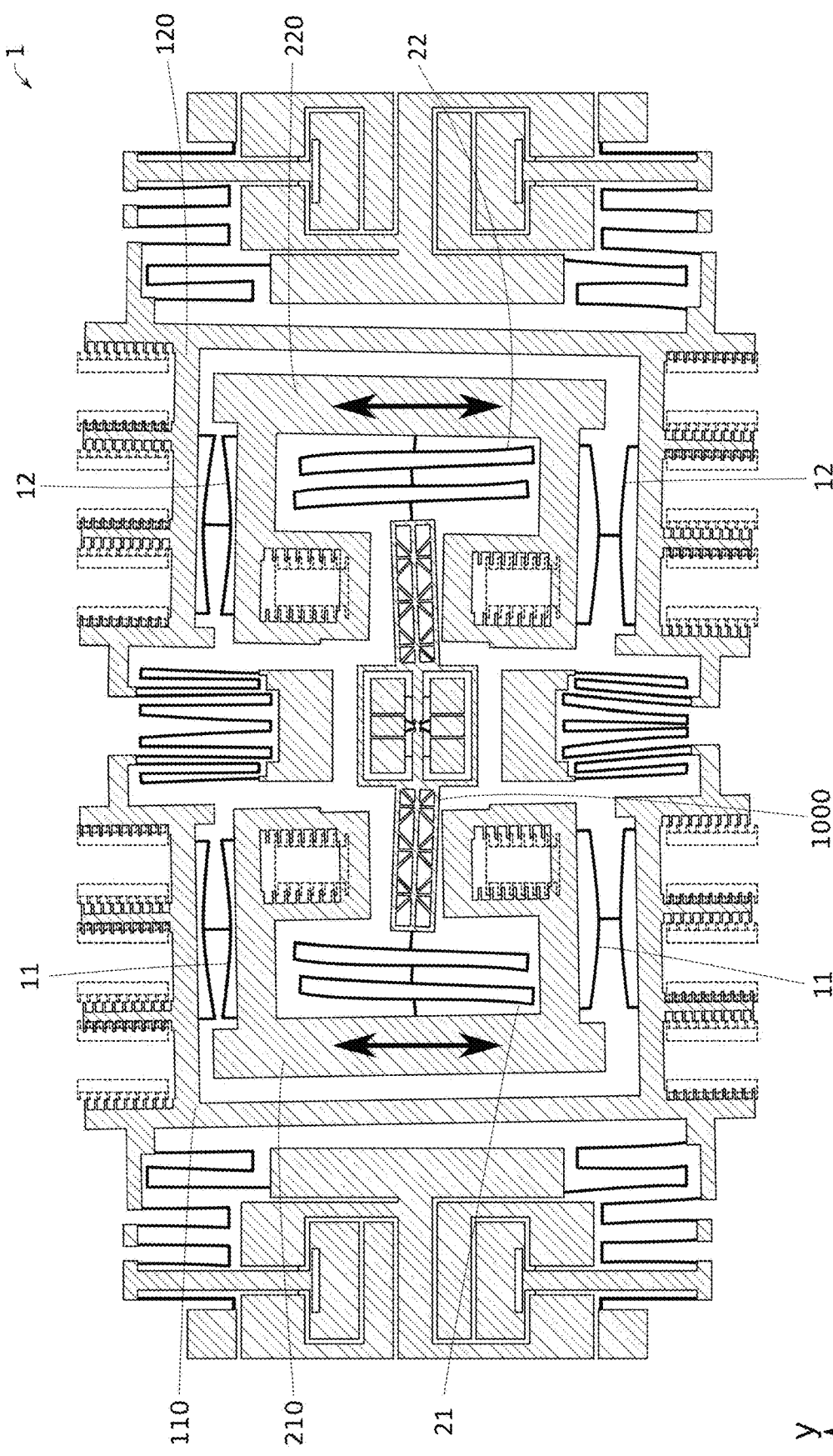
FIG. 3C illustrates the inertial sensor as claimed in the present patent application under a spurious mode.

Another crucial issue in angular rate sensing besides stress transmission is spurious noise minimization. Indeed, modes that do not contribute to angular rotation detection arise when an inertial sensor is in operation. One of these modes is shown in FIG. 3C. This mode is characterized by the first and the second sense frames 210, 220 moving concurrently in the same direction along the detection direction y, as opposed to moving in opposed senses along the detection direction y as in the case of the sense mode depicted in FIG. 3B. Other spurious modes can arise, some of them being characterized by out-of-plane motion of the first and second sense frames 210, 220. The first and the second sense frames 210, 220 can indeed rotate around the detection direction y, either with similar or opposed sense of rotation.

To ensure measurement quality, it is therefore essential to shift the frequency of each of these spurious modes far away from operating frequencies. The presence of a robust central portion 1500 and latticed arms 1100, 1200 are actually two features of the sense lever 1000 that maximize rejection to vibration and shift spurious modes to higher frequencies than already existing devices. As a result, the inertial device 1 can stand harsh environment that characterizes navigation grade applications. For example, the inertial sensor 1 has been implemented with operating frequencies set at about 24 kHz and a mode-split value $\Delta f$ typically in the range of 100 Hz to 600 Hz between the drive mode and the sense mode. It has been shown that the first spurious mode, depicted in FIG. 3C, occurred at 39.8 kHz. Experiments showed that thanks to such a sense lever architecture, all the spurious modes implying deformation of the piezoresistive elements were shifted towards frequencies higher than 40 kHz.

Electronic Scheme

Figure 5:
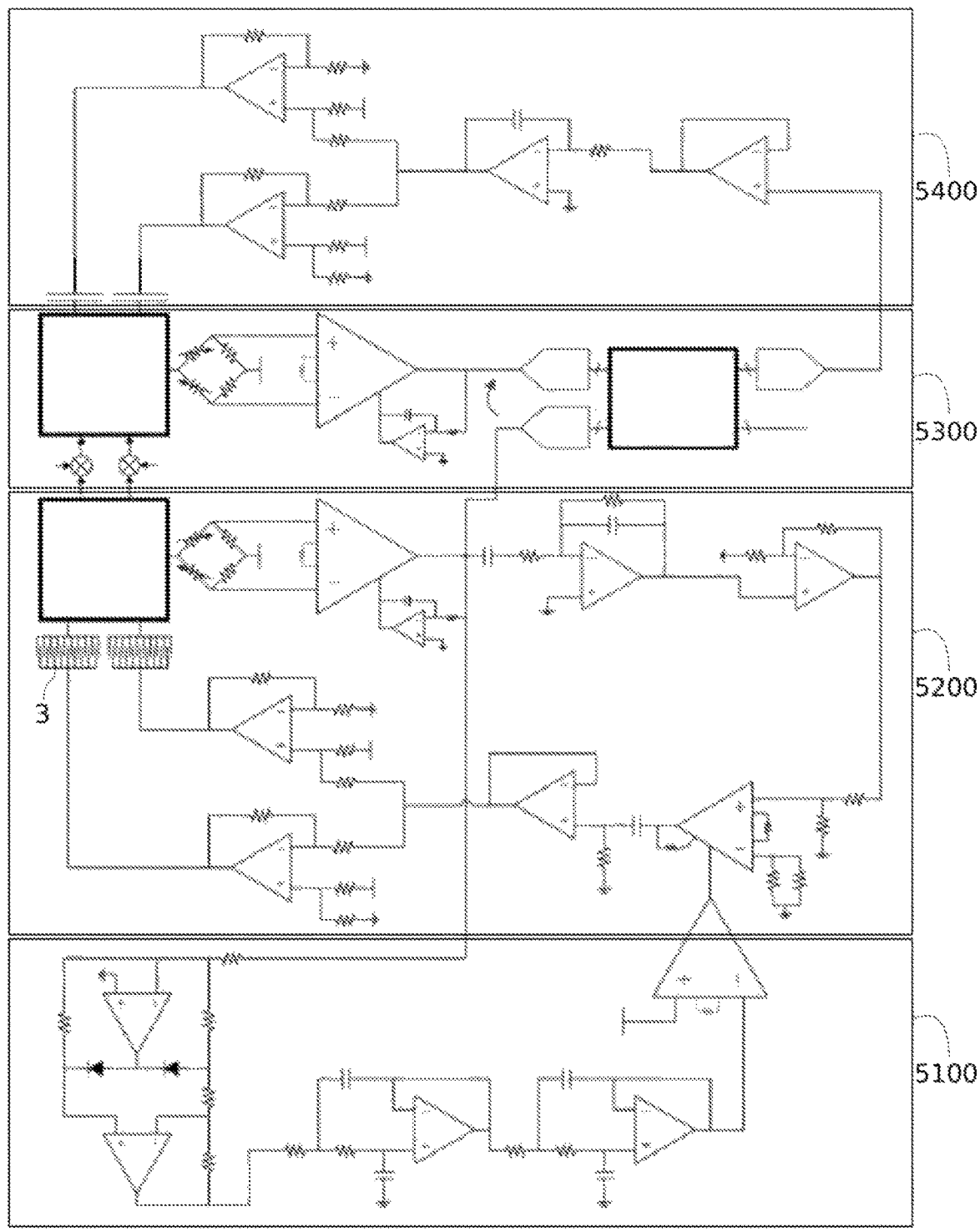
FIG. 5 illustrates the electronic circuit used to operate the inertial sensor.

FIG. 5 depicts a scheme of the electronic circuit 5000 used to operate the inertial sensor 1. The circuit 5000 can be divided in four main subcircuits:

An amplitude gain control subcircuit 5100 and a drive loop subcircuit 5200, both used for drive motion control. The drive loop subcircuit 5200 consists in a primary phase loop based on an instrumentation amplifier (INA) front-end, followed by an analog 90° phase shifter and a series of amplifying stages. The amplitude gain control subcircuit 5100 consists in a loop based on asynchronous rectifying and filtering. This loop sets the drive AC voltage amplitude, typically nominally around 200 mV. This value is applied to the excitation device 3 through a pair of buffers with opposite sign and summed to a 3 V DC level.

A sense subcircuit 5300 used for reading out the detection system of the inertial lever 1000 in open-loop mode. The sense subcircuit 5300 features an INA front-end stage identical to the drive-loop one, ensuring that relative phase lags introduced by these stages are self-compensated, thus minimizing their contribution to the phase change induced by the Coriolis force on the motion of the sense frames right before digital lock-in demodulation.

An automatic quadrature compensation subcircuit 5400 designed as a closed-loop feedback circuit. The compensation is achieved through a proportional-integrator analog controller, based on the signals arising from the strain gauges, and dedicated capacitive electrodes.

The circuit 5000 also features an offset nulling at the INA output of both the drive and the sense loops. This allows increasing the strain gauges current to the nominal maximum value, without incurring in anticipated INA saturation due to DC imbalance of the strain gauge resistances.

The electronic circuit 5000 can also feature an additional mode matching loop configured to ensure that the inertial device 1 is in mode-matched condition, namely that the resonant frequency of the drive mode and the resonant frequency of the sense mode are equal (i.e $\Delta f=0$). In this condition, the transmission of the Coriolis force onto the strain gauges is maximal. This embodiment is an alternative to a mode-split operation where $\Delta f \neq 0$.

Fabrication

The inertial device 1 can be realized starting from a SOI (Silicon On Insulator) wafer. During a first production step, monocrystalline silicon NEMS layer can be patterned to define the strain gauges 1600, 1700. Following production steps, during which other elements of the inertial sensors 1 (sense lever 1000—comprising its central portion 1500 and arms 1100, 1200, drive frames 110, 120, sense frames 210, 220 . . . ) are made—typically including epitaxial growth, ion etching and oxide release, are common to conventional MEMS processes. The MEMS wafer can then be bonded with eutectic Al—Ge alloy or with other bonding materials like Au—Si, glassfrit . . . to a cap wafer, where cavities and getters yield the final pressure, typically ranging from of a few ten to a few hundred µbar. Advantageously, the strain gauges 1600, 1700 are of the same material as the central portion 1500 and the arms 1100, 1200 of the sense lever 1000. Preferably, at least some of the strain gauges 1600, 1700 fabrication steps and of the central portion 1500 and arms 1100, 1200 fabrication steps are carried out concurrently.

Plurality of Sensors

Multiple inertial sensors of the same type can be merged to further improve the minimum achievable ARW and BI. This technique is commonly known as sensor fusion. This has the advantage of improving sensing properties of the inertial device without increasing its thickness if sensors are merged in the device plane. Large packages for specialized applications could fit several tens of inertial sensors 1, potentially exploiting redundancy and cross-correlation techniques for additional performance improvements.

Once again, a compromise has to be made, as increasing the number of sensors goes along with increasing biasing current and overall area and/or overall volume.

It was shown that, thanks to an innovative lever design, the inertial sensor 1 can match inertial navigation requirements. Furthermore, the design here described can fit within less than 0.1 mm³ of active silicon structural size, making it much smaller than already existing gyroscopes with equivalent performances.

The invention claimed is:

1. An inertial sensor comprising:
   a substrate which defines a device plane extending along a drive excitation direction and a detection direction normal to the drive excitation direction, the device plane being perpendicular to a rotation direction,
   a first drive frame and a second drive frame,
   a first sense frame connected to the first drive frame through at least one first decoupling spring that enables mechanical drive between the first drive frame and the first sense frame in the drive excitation direction and mechanically decouples the first drive frame and the first sense frame in the detection direction,
   a second sense frame connected to the second drive frame through at least one second decoupling spring that enables mechanical drive between the second drive frame and the second sense frame in the drive excitation direction and mechanically decouples the second drive frame and the second sense frame in the detection direction,
   a sense lever pivotably mounted around a rotation axis directed along the rotation direction,
   a sensing system connected to the sense lever and comprising at least one strain gauge mechanically stressed by the sense lever when said sense lever is rotating around the rotation axis, and
   an excitation device configured to force the first drive frame and the second drive frame into opposite motions going along the drive excitation direction,
   wherein:
      the sense lever includes a central portion, a first arm and a second arm, the first arm being joined to a first side of the central portion and the second arm being joined to a second side, opposite the first side, of the central portion,
      the first sense frame is connected to the first arm of the sense lever through at least one first sense spring that enables mechanical drive between the first sense frame and the sense lever in the detection direction and mechanically decouples the first sense frame and the sense lever in the drive excitation direction,
      the second sense frame is connected to the second arm of the sense lever through at least one second sense spring that enables mechanical drive between the second sense frame and the sense lever in the detection direction and mechanically decouples the second sense frame and the sense lever in the drive excitation direction, and
      the central portion of the sense lever having a dimension along the detection direction called central width, the first arm and the second arm of the sense lever having a same dimension along the detection direction called arm width, the central width being at least twice greater than the arm width.

2. The inertial sensor according to claim 1, wherein the central width is at least three times greater than the arm width.

3. The inertial sensor according to claim 1, wherein the central portion comprises a central frame defining an outer closed contour of said central portion.

4. The inertial sensor according to claim 3, wherein the central portion comprises a central beam extending along the drive excitation direction, the central beam including a first end and a second end, the first end being joined to a first inner side of the central frame and the second end being joined to a second inner side, opposite the first inner side, of the central frame.

5. The inertial sensor according to claim 1, wherein the central portion has a rectangular contour in the device plane.

6. The inertial sensor according to claim 1, wherein at least one of the first arm and the second arm has a triangulated structure.

7. The inertial sensor according to claim 1, wherein the sensing system comprises a first strain gauge mechanically stressed by the first arm of the sense lever and a second strain gauge mechanically stressed by the second arm of the sense lever when said sense lever is rotating around the rotation axis.

8. The inertial sensor according to claim 7, wherein the sensing system further comprises a first additional strain gauge mechanically stressed by the first arm of the sense lever and a second additional strain gauge mechanically stressed by the second arm of the sense lever when said sense lever is rotating around the rotation axis, the first additional strain gauge being symmetrical to the second strain gauge around the rotation axis and the second additional strain gauge being symmetrical to the first strain gauge about the rotation axis.

9. The inertial sensor according to claim 1, wherein the first sensing frame accommodates a first compensation electrode and the second sensing frame accommodates a second compensation electrode.

10. The inertial sensor according to claim 9, wherein the first sensing frame further accommodates a first additional compensation electrode and the second sensing frame further accommodates a second additional compensation electrode, the first compensation electrode and the second compensation electrode on the one hand and the first additional compensation electrode and the second additional compensation electrode on the other hand being symmetrical about the rotational axis.

11. The inertial sensor according to claim 1, wherein the sense lever is connected to the substrate through a single central hinge.

12. The inertial sensor according to claim 1, wherein the first drive frame and the second drive frame are connected through at least one connection spring.

13. The inertial sensor according to claim 1, wherein the first drive frame and the second drive frame are both connected to the substrate through at least one additional drive spring.

14. The inertial sensor according to claim 1, wherein a central region of the sense lever accommodates the sensing system.

15. The inertial sensor according to claim 1, wherein the sensing system comprises at least one connection zone configured to electronically connect the at least one strain gauge.

16. A detection system comprising a plurality of inertial sensors according to claim 1.

17. The detection system according to claim 16, wherein at least two of the plurality of inertial sensors have perpendicular rotation directions.

* * * * *